(12) United States Patent
Lee (10) Patent No.: US 11,474,407 B2
(45) Date of Patent: Oct. 18, 2022

(54) MULTILAYERED THIN FILM TRANSPARENT ELECTRODE FOR ELECTROCHROMIC DEVICE AND MANUFACTURING METHOD THEREOF

(71) Applicant: CHEONGJU UNIVERSITY INDUSTRY & ACADEMY COOPERATION FOUNDATION, Cheongju-si (KR)

(72) Inventor: Sang Yeol Lee, Seoul (KR)

(73) Assignee: Cheongju University Industry & Academy Cooperation Foundation, Cheongju-si (KR)

(*) Notice: Subject to any disclaimer, the term of this patent is extended or adjusted under 35 U.S.C. 154(b) by 552 days.

(21) Appl. No.: 16/476,234

(22) PCT Filed: Jan. 31, 2019

(86) PCT No.: PCT/KR2019/001371
§ 371 (c)(1),
(2) Date: Jul. 5, 2019

(87) PCT Pub. No.: WO2091/151801
PCT Pub. Date: Aug. 8, 2019

(65) Prior Publication Data
US 2021/0232012 A1    Jul. 29, 2021

(30) Foreign Application Priority Data

Jan. 31, 2018   (KR) .................... 10-2018-0011966

(51) Int. Cl.
*G02F 1/155* (2006.01)

(52) U.S. Cl.
CPC .................................. *G02F 1/155* (2013.01)

(58) Field of Classification Search
CPC ...................................................... G02F 1/155
See application file for complete search history.

(56) References Cited

U.S. PATENT DOCUMENTS

| 6,379,743 B1 * | 4/2002 | Lee ....................... C07C 211/54 |
| | | 427/164 |
| 8,823,653 B2 * | 9/2014 | Matsuo ................. G06F 3/0443 |
| | | 345/173 |
| 9,911,944 B2 * | 3/2018 | Chen .................... H01L 27/3279 |
| 2001/0005528 A1 * | 6/2001 | Lee ....................... H01L 51/0035 |
| | | 427/248.1 |
| 2002/0196517 A1 * | 12/2002 | Nimura ............. G02F 1/133553 |
| | | 359/245 |

(Continued)

FOREIGN PATENT DOCUMENTS

| JP | 2005274776 A | 10/2005 |
| JP | 2013045063 A | 3/2013 |

(Continued)

*Primary Examiner* — Fred Tzeng (74) *Attorney, Agent, or Firm* — Novick, Kim & Lee, PLLC; Sang Ho Lee; Hyun Woo Shin (57) ABSTRACT

Provided is a multilayered thin film transparent electrode for an electrochromic device including: a substrate; a lower oxide layer located on the substrate; a metal layer located on the lower oxide layer; and an upper oxide layer located on the metal layer, and a thickness of a center portion of the metal layer is larger than a thickness of an edge.

10 Claims, 7 Drawing Sheets

(56) References Cited

U.S. PATENT DOCUMENTS

| | | | | |
|---|---|---|---|---|
| 2005/0224795 A1* | 10/2005 | Gotoh | ............... | G02F 1/136227 257/59 |
| 2009/0141230 A1* | 6/2009 | Inoue | ....................... | C04B 41/52 349/158 |
| 2009/0244028 A1* | 10/2009 | Matsuo | ................. | G06F 3/0443 345/174 |
| 2011/0017711 A1* | 1/2011 | Nakada | ................. | B23K 26/10 219/121.18 |
| 2012/0223349 A1* | 9/2012 | Lee | ..................... | H01L 51/5234 257/98 |
| 2013/0101867 A1* | 4/2013 | Yukinobu | ................. | C01F 7/02 428/702 |
| 2013/0153024 A1* | 6/2013 | Abe | ........................ | C23C 14/34 136/256 |
| 2016/0087126 A1* | 3/2016 | Nakagawa | .......... | H01L 31/0322 136/262 |
| 2016/0293688 A1* | 10/2016 | Chen | .................... | H01L 27/3265 |
| 2018/0209859 A1* | 7/2018 | Ho | .......................... | G01L 1/146 |
| 2018/0314147 A1* | 11/2018 | Ma | ............................. | G03F 1/50 |
| 2020/0083254 A1* | 3/2020 | Xu | ...................... | H01L 27/1288 |

FOREIGN PATENT DOCUMENTS

| | | |
|---|---|---|
| JP | 2016207027 A | 12/2016 |
| KR | 10-2010-0055750 A | 5/2010 |
| KR | 10-2010-0067503 A | 6/2010 |
| KR | 10-2017-0104189 A | 9/2017 |
| KR | 10-2017-0112310 A | 10/2017 |
| KR | 10-2017-0115864 A | 10/2017 |
| KR | 10-2017-0142473 A | 12/2017 |
| KR | 10-2018-0000169 A | 1/2018 |
| KR | 10-2018-0000173 A | 1/2018 |
| KR | 10-2018-0000181 A | 1/2018 |

* cited by examiner

MULTILAYERED THIN FILM TRANSPARENT ELECTRODE FOR ELECTROCHROMIC DEVICE AND MANUFACTURING METHOD THEREOF

TECHNICAL FIELD

The present invention relates to a multilayered thin film transparent electrode for an electrochromic device, and more particularly, to a multilayered thin film transparent electrode for an electrochromic device for improving a large area performance uniformity and a manufacturing method thereof.

BACKGROUND ART

A transparent electrode is a component which is basically required for a resistive film type or an electrostatic induction type touch screen in addition to an electrode for a display applied to an LCD or an OLED. Further, the transparent electrode is used not only for an organic solar cell, but also for a light receiving element or a light emitting element. Further, a large size transparent electrode is also used for a smart window which is an electrochromic glass. In addition, there is a wide range of purposes such as a transparent film requiring an electromagnetic wave shielding function and a transparent glass to which the transparent film is applied.

A representative transparent electrode which is commercialized until now is indium tin oxide (ITO) which is thinly coated on an optical glass. Generally, the ITO transparent electrode is manufactured by forming an electrode material including ITO powder particles on a glass substrate as a thin film through a process such as sputtering or digital printing. The ITO transparent electrode has an advantage that satisfies performance requirements as a transparent electrode in most electrical products such as a touch screen.

However, the ITO transparent electrode has disadvantages such as a resistivity by a transparent electrode layer, a resistivity of an electrochromic material, and a slow electrochromic speed due to slow diffusion speed of metal ions into an electrochromic material layer. Therefore, there are disadvantages in that it is necessary to use expensive materials and it is disadvantageous to increase the size.

Therefore, it is necessary to develop higher efficient transparent electrodes for production of low-cost and large-area electrochromic devices.

As a related art, there is Korean Unexamined Patent Application Publication No. 10-2018-0000181 (entitled Multilayer transparent electrode and manufacturing method thereof, published on Aug. 28, 2018).

DISCLOSURE

Technical Problem

An object of the present invention is to provide a multilayered thin film transparent electrode for an electrochromic device with a structure in which a thickness of a center portion is larger than that of an edge to achieve a uniform electrochromism speed and improve large area performance uniformity.

Technical problems of the present invention are not limited to the above-mentioned technical problem(s), and other technical problem(s), which are not mentioned above, can be clearly understood by those skilled in the art from the following descriptions.

Technical Solution

A multilayered thin film transparent electrode for an electrochromic device according to an exemplary embodiment of the present invention includes a substrate, a lower oxide layer located on the substrate, a metal layer located on the lower oxide layer, and an upper oxide layer located on the metal layer and a thickness of a center portion of the metal layer is larger than a thickness of an edge.

Further, according to the exemplary embodiment of the present invention, the metal layer may be formed of one single metal or an alloy of two or more selected from Ag, Au, Ti, Ni, Mo, Cu, and Al.

Further, according to the exemplary embodiment of the present invention, the lower oxide layer and the upper oxide layer may be formed of one single metal or an alloy of two or more metals selected from Ti, Ga, Al, Ge, As, Cu, Mn, Zr, Nb, Ru, Hf, Zn, Sr, Ba, Fe, Ag, In, Re, Cr, Ni, Mo, V, W, Mg, Si, Sn, and Ta.

Further, according to the exemplary embodiment of the present invention, thicknesses of the lower oxide layer and the upper oxide layer may be 10 to 1000 nm and a thickness of the metal layer may be 1 to 200 nm.

Further, according to the exemplary embodiment of the present invention, the edge of the metal layer may be located on the same line as an edge of the lower oxide layer.

Further, according to the exemplary embodiment of the present invention, the metal layer may include first to n-th metal layers in this order and satisfy the following Equation 1.

Area of upper portion of $n$-2-$th$ metal layer>Area of upper portion of $n$-1-$th$ metal layer>Area of upper portion of $n$-$th$ metal layer   [Equation 1]

($n$ is a natural number which is equal to or larger than 3)

Further, according to the exemplary embodiment of the present invention, a side surface of the metal layer may be formed to have a step shape.

Further, according to the exemplary embodiment of the present invention, the first to n-th metal layers may have the same thickness.

Further, according to the exemplary embodiment of the present invention, the multilayered thin film transparent electrode for an electrochromic device may further include a refractive index matching layer in a structure of the multilayered thin film transparent electrode.

Further, a manufacturing method of a multilayered thin film transparent electrode for an electrochromic device according to an exemplary embodiment of the present invention includes: preparing a substrate, forming a lower oxide layer on the substrate, forming a metal layer in which a thickness of a center portion is larger than that of an edge, on the lower oxide layer, and forming an upper oxide layer on the metal layer.

Further, according to the exemplary embodiment of the present invention, the manufacturing method of a multilayered thin film transparent electrode for an electrochromic device may further include a heating step of 50 to 900° C. after performing the forming of an upper oxide layer on the metal layer.

Advantageous Effects

According to an exemplary embodiment of the present invention, in a metal layer of the multilayered transparent electrode for an electrochromic device, the thickness is increased from an edge to a center portion thereof so that the resistivity is lowered toward the center portion, and thus the electrochromism at the center portion may more rapidly occur.

According to the exemplary embodiment of the present disclosure, the electrochromism difference between the edge portion and the center portion is reduced and a rapider electrochromic reaction speed when the area is increased may be expected.

DESCRIPTION OF MAIN REFERENCE NUMERALS OF DRAWINGS

10: Multilayered thin film transparent electrode for electrochromic device
100: Substrate
200: Lower oxide layer
300: Metal layer
310: n-th metal layer
320: n–2-th metal layer
330: n–1-th metal layer
340: n-th metal layer 400: Upper oxide layer
500: Refractive index matching layer

BEST MODE

Advantages and/or characteristics of the present invention and a method of achieving the advantages and characteristics will be clear by referring to exemplary embodiments described below in detail together with the accompanying drawings. However, the present disclosure is not limited to the following exemplary embodiments but may be implemented in various different forms. The exemplary embodiments are provided only to complete disclosure of the present disclosure and to fully provide a person having ordinary skill in the art to which the present disclosure pertains with the category of the disclosure, and the present disclosure will be defined by the appended claims. Like reference numerals indicate like elements throughout the specification.

A transparent electrode is a component which is basically required for a resistive film type or an electrostatic induction type touch screen in addition to an electrode for a display applied to an LCD or an OLED.

Figure 1:
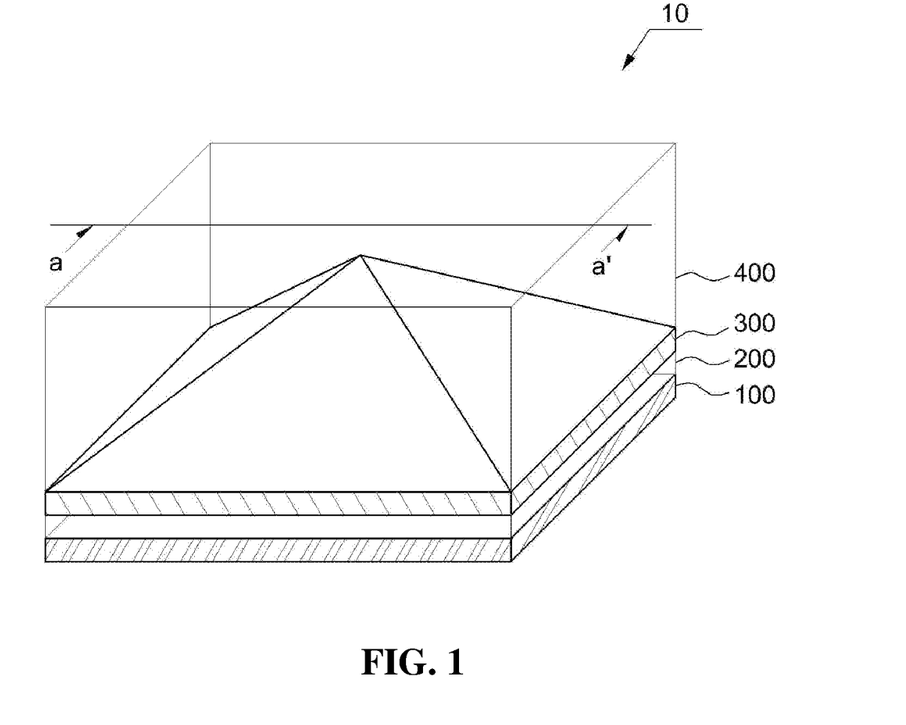
FIG. 1 is a perspective view of a multilayered thin film transparent electrode for an electrochromic device according to an exemplary embodiment of the present invention.
Figure 2:
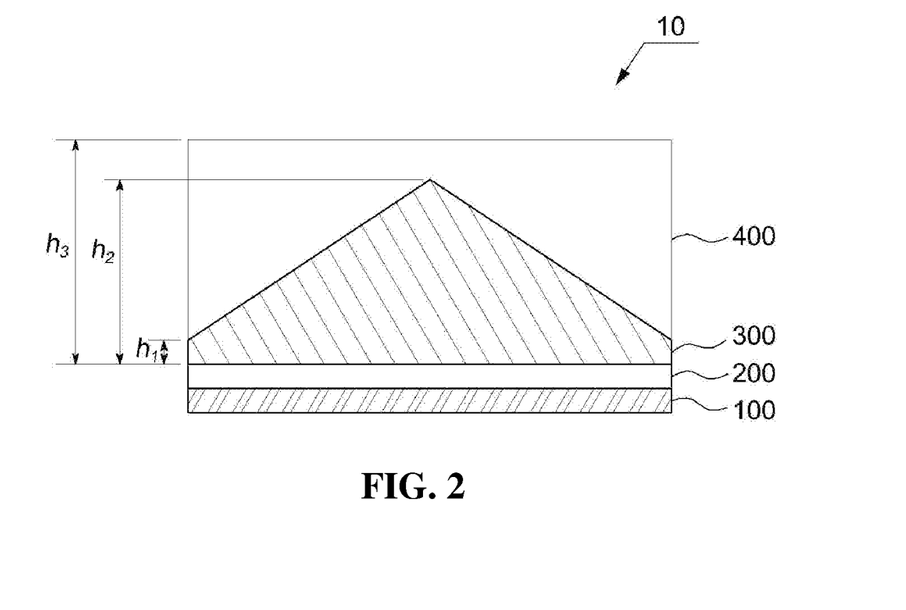
FIG. 2 is a cross-sectional view taken along the line a-a' of FIG. 1.

FIG. 1 is a perspective view of a multilayered thin film transparent electrode for an electrochromic device according to an exemplary embodiment of the present invention and FIG. 2 is a cross-sectional view taken along the line a-a' of FIG. 1.

As illustrated in FIGS. 1 and 2, the multilayered thin film transparent electrode for an electrochromic device includes a substrate 100, a lower oxide layer 200, a metal layer 300 formed on the lower oxide layer 200, an upper oxide layer 400 formed on the metal layer 300 and a thickness of a center portion of the metal layer 300 is larger than a thickness of an edge.

Such a multilayered thin film transparent electrode for an electrochromic device is a component which is basically required for a resistive film type or an electrostatic induction type touch screen in addition to an electrode for a display applied to an LCD or an OLED. Further, the transparent electrode is used not only for an organic solar cell, but also for a light receiving element or a light emitting element. Further, a large size transparent electrode is also used for a smart window which is an electrochromic glass. In addition, there is a wide range of purposes such as a transparent film requiring an electromagnetic wave shielding function and a transparent glass to which the transparent film is applied.

The multilayered thin film transparent electrode for an electrochromic device has a structure in that the substrate 100, the lower oxide layer 200, the metal layer 300, and the upper oxide layer 400 are sequentially disposed. That is, the oxide layers are disposed with the metal layer 300 therebetween on and below the metal layer 300 so that a multilayered structure of the oxide/metal/oxide is formed.

The substrate 100 is a transparent substrate formed of glass or a plastic material.

Specifically, the plastic material is formed of a material having excellent transmittance for visible ray and excellent flexibility against the physical deformation. For example, the plastic material may be formed of a plastic film layer such as polyethylene terephthalate (PET), polypropylene (PP), or polyethylene (PE) or a plastic sheet formed of acrylic resin. Further, the glass material may be formed of heat strengthened glass used for a display. The substrate may have a thickness of 20 to 700 μm depending on a usage purpose and requirements. The transparent substrate 100 may have visible ray transmittance of 80% or higher.

The lower oxide layer 200 and the upper oxide layer 400 are formed by oxidizing a single metal or an alloy. For example, one single metal or an alloy of two or more metals selected from Ti, Ga, Al, Ge, As, Cu, Mn, Zr, Nb, Ru, Hf, Zn, Sr, Ba, Fe, Ag, In, Re, Cr, Ni, Mo, V, W, Mg, Si, Sn, and Ta is oxidized to form the oxide layers.

For example, the oxide layer may be formed by oxidizing an alloy containing tungsten (W) and titanium (Ti) and in this case, 45 to 55 wt % of tungsten and 45 to 55 wt % of titanium may be contained based on a total weight of the alloy. That is, the oxide layer may be formed by an alloy consisting only of tungsten and titanium.

Next, the metal layer 300 may be formed of a signal metal or an alloy of two or more metals selected from Ag, Au, Ti, Ni, Mo, Cu, and Al.

Thicknesses of the lower oxide layer 200 and the upper oxide layer 400 are 10 to 1000 nm and a thickness of the metal layer 300 is 1 to 200 nm.

In this case, the thickness of the metal layer 300 influences the electrical characteristic and the transmittance of the multilayered thin film transparent electrode 10 for an electrochromic device and is optimized with a thickness of 1 to 200 nm. Specifically, a wavelength range of light which is highly transmitted at 80% or higher varies depending on the thickness which varies so that the thickness of the metal layer 300 may be selectively determined in consideration of the wavelength of light in the above-described range. However, the thickness of the metal layer 300 is not necessarily limited to the above-described range, so that the metal layer 300 may be formed to have various thicknesses depending on a material, the lower oxide layer 200, and the upper oxide layer 400.

Further, the lower oxide layer 200 and the upper oxide layer 400 basically serve to improve the transmittance by reducing the reflection and the refractive index of light by the metal layer 300 and serve to protect the metal layer 300 which may be easily oxidized. Further, the thicknesses thereof also influence the transmittance, like the metal layer 300, so that 10 to 1000 nm of thickness is appropriate to ensure an optimal transmittance. However, the thicknesses are not necessarily limited thereto and various thicknesses may be selected in consideration of a material, a thickness, and a usage condition of the lower oxide layer 200, the metal layer 300, and the upper oxide layer 400.

In the meantime, the lower oxide layer 200 and the upper oxide layer 400 are transparent oxides having a bandwidth of 3 eV or higher. The lower oxide layer 200 and the upper oxide layer 400 need to be a transparent electrode material having transmittance of approximately 80% in a visible ray region (400 nm to 700 nm) and having a high electric conductivity of $10^3/\Omega \cdot cm$. Since an optical bandwidth is approximately 3.5 eV, the oxide layers need to transmit all ultraviolet regions and have a high reflectivity in an infrared region and an appropriate etching property.

Further, the metal layer 300 has a plasmon phenomenon at an interface with the lower oxide layer 200 and the upper oxide layer 400. The interfacial plasmon phenomenon is a collective oscillation phenomenon of surface free electrons occurring on a surface of a metal thin film or nano particles. The light passes through the metal particles by the collective oscillation phenomenon of free electrons to appear transparent, which results in improvement of transmittance in a specific wavelength region. Specifically, the transmittance of the multilayered thin film transparent electrode for an electrochromic device may be 80% to 90%.

As described above, the metal layer 300 of the present invention is characterized in that a thickness of the center portion is larger than that of the edge and the thickness is increased from the edge to the center portion. The edge of the metal layer 300 may have a predetermined height h1 and the center portion of the metal layer 300 has a predetermined height h2 which is larger than the height h1 of the edge of the metal layer 300 and is smaller than a height h3 of the upper oxide layer 400. In other words, the metal layer 300 may have a quadrangular pyramid shape in which the edge has a predetermined height h1 but is not limited thereto and may have a conical shape, a triangular pyramid shape, or other polygonal pyramid shapes.

Specifically, the electrical characteristic of the transparent electrode having the oxide/metal/oxide structure is directly influenced by the thickness of the intermediate material layer 300. When the transparent electrode has a structure according to the exemplary embodiment of the present disclosure, the center portion has an excellent electrical characteristic that the resistivity is lower than that of the edge, which may result in improvement of a degree of discoloration of electrochromism and a speed thereof.

Further, the edge of the metal layer 300 of the present invention is located on the same line as the edge of the lower oxide layer 200.

Specifically, an area of the lowermost portion of the metal layer 300 is equal to an area of the upper portion of the lower metal layer 200 and the lowermost portion of the metal layer 300 is exposed to the outside with a predetermined height h1. In this case, there are advantages in that the connection between the metal layer 300 and the filament is easy and a surface contact is possible so that a contact resistance may be reduced. However, the present invention is not limited to the above-described exemplary embodiment and when the metal layer 300 is not exposed to the outside, the connection through a line contact may also be included.

Figure 3:
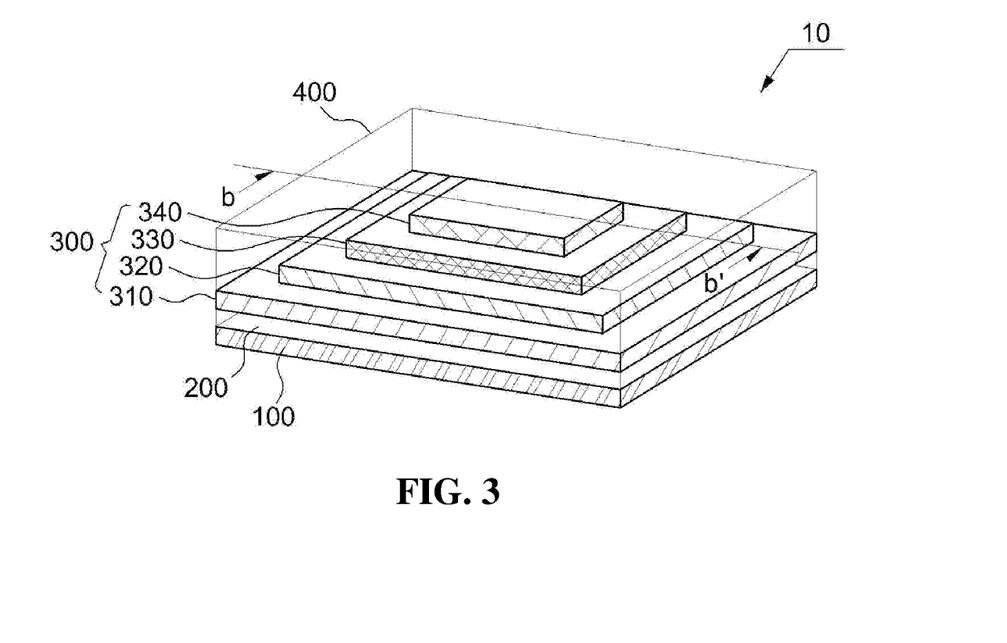
FIG. 3 is a perspective view of a multilayered thin film transparent electrode for an electrochromic device according to another exemplary embodiment of the present invention.
Figure 4:
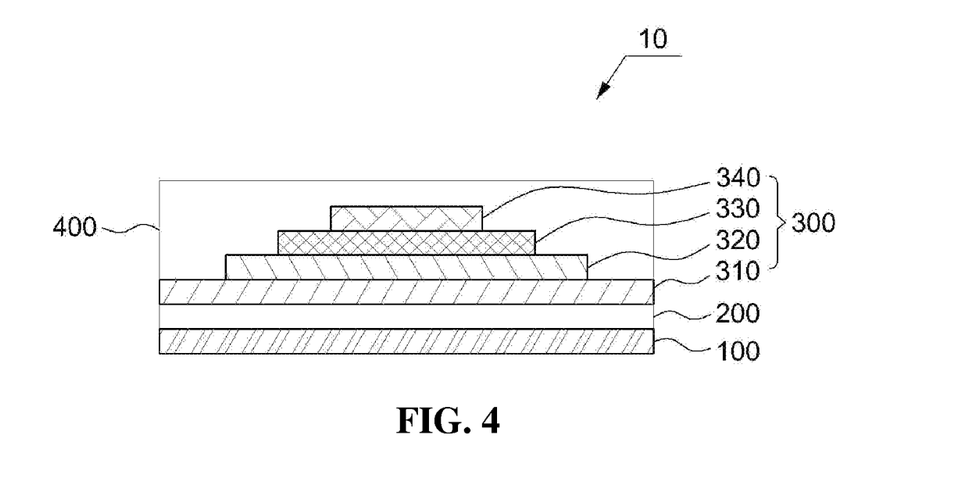
FIG. 4 is a cross-sectional view taken along the line b-b' of FIG. 3.
Figure 5:
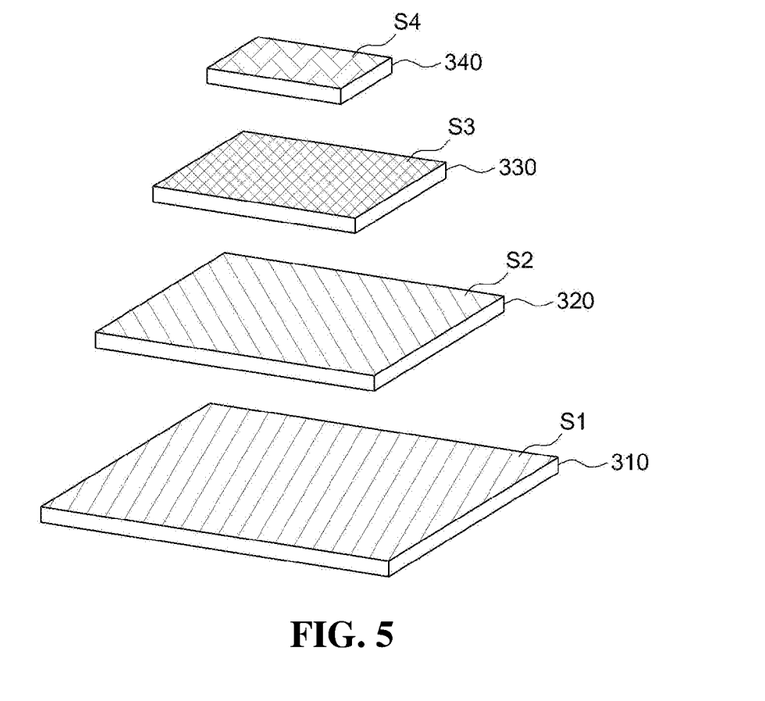
FIG. 5 is an exploded perspective view of a metal layer according to an exemplary embodiment of the present invention.

FIG. 3 is a perspective view of a multilayered thin film transparent electrode for an electrochromic device according to another exemplary embodiment of the present invention, FIG. 4 is a cross-sectional view taken along the line b-b' of FIG. 3, and FIG. 5 is an exploded perspective view of a metal layer according to an exemplary embodiment of the present invention.

As illustrated in FIGS. 3 and 4, the metal layer 300 includes first to n-th metal layers in this order and satisfies the following Equation 1.

$$\text{Area of upper portion of } n\text{-}2\text{-}th \text{ metal layer} > \text{Area of upper portion of } n\text{-}1\text{-}th \text{ metal layer} > \text{Area of upper portion of } n\text{-}th \text{ metal layer} \quad [\text{Equation 1}]$$

(n is a natural number which is equal to or larger than 3)

Further, a side surface of the metal layer 300 is formed to have a step shape and first to n-th metal layers have the same thickness.

The area of the metal layer 300 satisfies the following Equation 2.

$$(\text{Area of upper portion of } n\text{-}1\text{-}th \text{ metal layer})/(\text{Area of upper portion of } n\text{-}th \text{ metal layer}) = C \quad [\text{Equation 2}]$$

(n is a natural number which is equal to or larger than 3 and C is a constant)

Specifically, the metal layer 300 includes first to n-th metal layers in this order. Here, n denotes the number of layers of the metal layer 300 and is desirably a natural number which is equal to or larger than 3.

The metal layer 300 may include an n–3-th metal layer 310, an n–2-th metal layer 320, an n–1-th metal layer 330, and an n-th metal layer 340 in this order and when n is 4, the n–3-th metal layer 310 may be a first metal layer 310.

As illustrated in FIG. 5, an area of the metal layer 300 may be reduced at a predetermined rate as the height is increased. Specifically, the area may be represented as follows.

(Area S1 of upper portion of first metal layer)/(Area S2 of upper portion of second metal layer)= (Area S2 of upper portion of second metal layer)/(Area S3 of upper portion of third metal layer)=(Area S3 of upper portion of third metal layer)/(Area S4 of upper portion of fourth metal layer)

(when n is 4)

An effect of saving the cost for a manufacturing process may be obtained by the simplified structure characteristic and excellent discoloration speed and discoloration difference may be obtained as compared with the electrochromic device using a normal transparent electrode of the related art.

Figure 6:
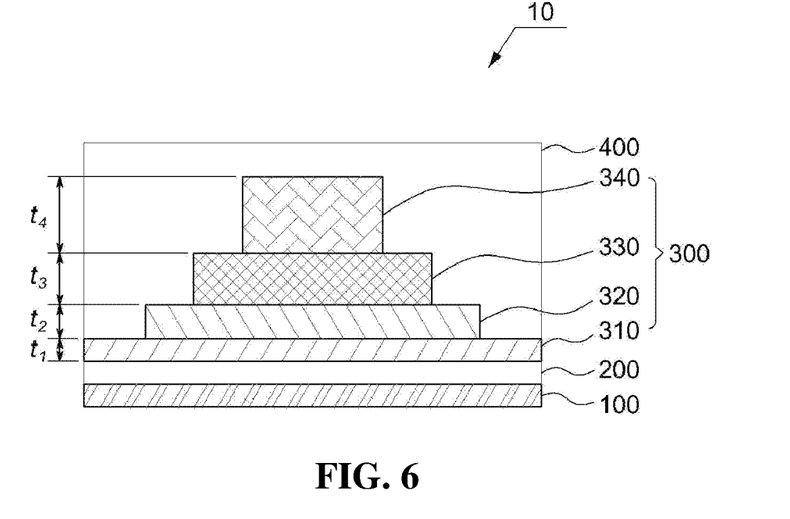
FIG. 6 is a cross-sectional view of a multilayered thin film transparent electrode for an electrochromic device including metal layers having different thicknesses, according to another exemplary embodiment of the present invention.

FIG. 6 is a cross-sectional view of a multilayered thin film transparent electrode for an electrochromic device including metal layers having different thicknesses, according to another exemplary embodiment of the present invention.

As illustrated in FIG. 6, thicknesses of the first to n-th metal layers may satisfy the following Equation 3.

Thickness of $n-2$-th metal layer<Thickness of $n-1$-th metal layer<Thickness of $n$-th metal layer  [Equation 3]

(n is a natural number which is equal to or larger than 3)

The metal layer 300 may include an n−3-th metal layer 310, an n−2-th metal layer 320, an n−1-th metal layer 330, and an n-th metal layer 340 in this order and when n is 4, the n−3-th metal layer 310 may be a first metal layer 310. Specifically, this may be represented as follows.

Thickness $t4$ of fourth metal layer>Thickness $t3$ of third metal layer>Thickness $t2$ of second metal layer>Thickness $t1$ of first metal layer (when n is 4)

By doing this, the electrical conductivity of the multilayered thin film transparent electrode for an electrochromic device may be arbitrarily changed so that it is applicable to various displays.

Figure 7:
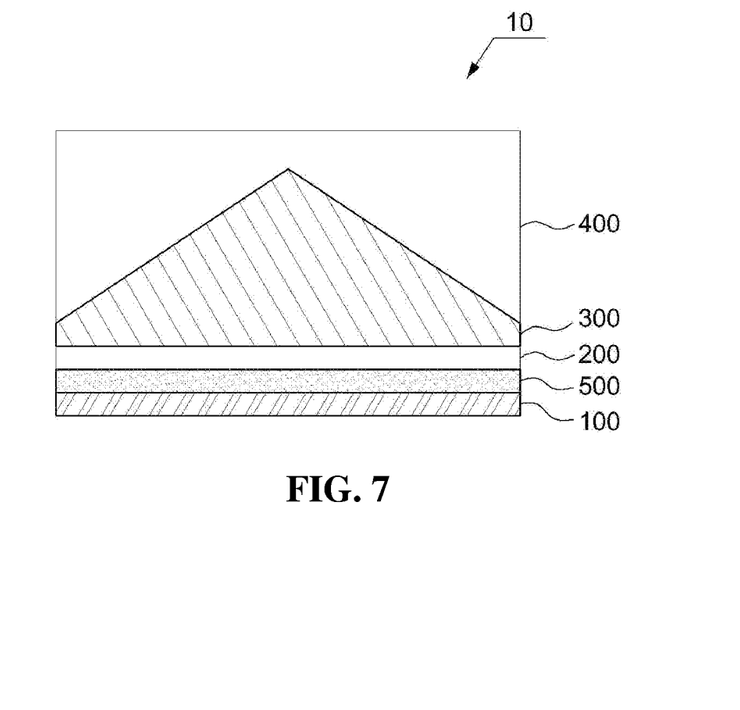
FIG. 7 is a cross-sectional view of a multilayered thin film transparent electrode for an electrochromic device further including a refractive index matching layer, according to another exemplary embodiment of the present invention.

FIG. 7 is a cross-sectional view of a multilayered thin film transparent electrode for an electrochromic device further including a refractive index matching layer, according to another exemplary embodiment of the present invention.

As illustrated in FIG. 7, the multilayered thin film transparent electrode for an electrochromic device further includes a refractive index matching layer 500 in a multilayered thin film transparent electrode structure.

Desirably, the refractive index matching layer 500 may be located between the substrate 100 and the lower oxide layer 200.

The refractive index matching layer 500 is a component serving to match refractive indexes between the substrate 100 and the lower oxide layer 200.

Specifically, unlike the related art which is configured by multiple layers, the refractive index matching layer 500 is configured in the form of a continuous film and specifically, may include a continuous silicon oxynitride (SiOxNy) layer which starts from silicon dioxide SiO2 and continuously changes to silicon nitride Si3N4.

By doing this, the deterioration of an image quality of the display due to the difference in refractive indexes between the substrate 100 and the lower oxide layer 200 is prevented.

Figure 8:
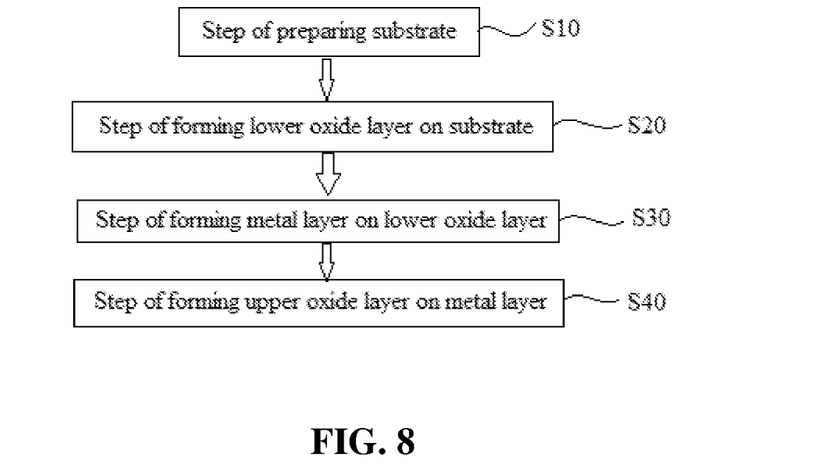
FIG. 8 is a flowchart illustrating a manufacturing method of a multilayered thin film transparent electrode for an electrochromic device according to an exemplary embodiment of the present invention.

FIG. 8 is a flowchart illustrating a manufacturing method of a multilayered thin film transparent electrode for an electrochromic device according to an exemplary embodiment of the present invention.

First, a substrate 100 which is formed of glass of a transparent material or a plastic material is located in step S10.

Next, a lower oxide layer 200 is located on the substrate 100 in step S20.

Next, a metal layer 300 is located on the lower oxide layer 200 in step S30.

Next, an upper oxide layer 400 is located on the metal layer 300 in step S40.

Specifically, the metal layer 300, the lower oxide layer 200, and the upper oxide layer 400 may be formed by any one of a pulse laser deposition process, a thermal deposition process, an electron beam deposition process, an atomic layer deposition process, a wet solution process including a printing process and a spray process, and a sputtering process.

Figure 9:
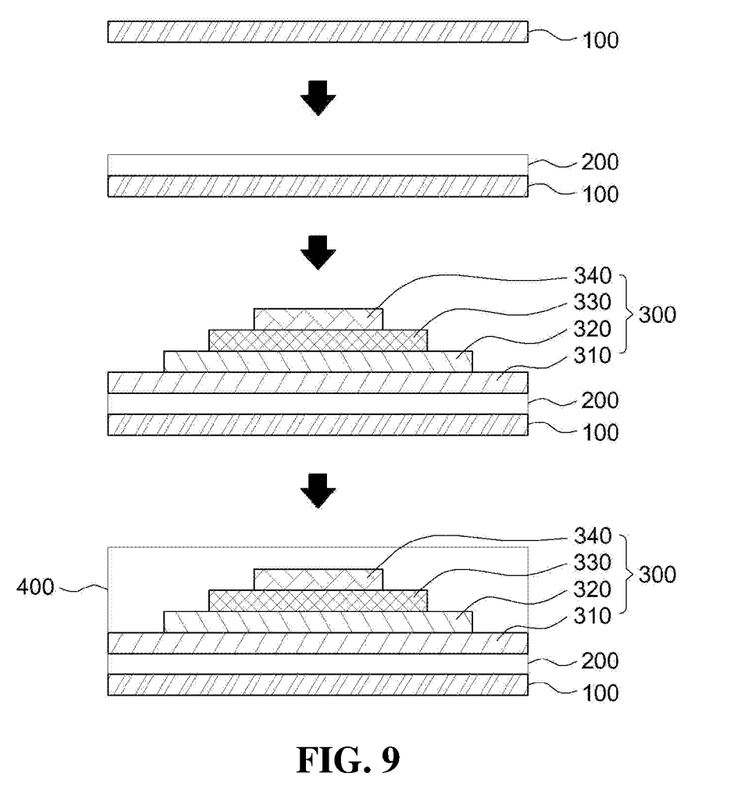
FIG. 9 is a flowchart illustrating a manufacturing method of a multilayered thin film transparent electrode for an electrochromic device using a deposition process according to an exemplary embodiment of the present invention.

FIG. 9 is a flowchart illustrating a manufacturing method of a multilayered thin film transparent electrode for an electrochromic device using a deposition process according to an exemplary embodiment of the present invention.

As illustrated in FIG. 9, in a step of forming the metal layer 300 in which a thickness of a center portion is larger than a thickness of an edge on the lower oxide layer 200, after forming the metal layer 300 on the lower oxide layer 200, the metal layer is etched such that the first to n-th metal layers satisfying the following Equation 1 are included in this order.

(Area of upper portion of $n-2$-th metal layer)>(Area of upper portion of $n-1$-th metal layer)>(Area of upper portion of $n$-th metal layer)  [Equation 1]

(n is a natural number which is equal to or larger than 3)

Specifically, a step of forming a first metal layer 310 having a predetermined height on the lower oxide layer 200 and deposing an n−2-th metal layer 320 having a predetermined height by a process of deposing a portion which requires a pattern at a boundary of the first metal layer 310 using a shadow mask and forming a film in a portion which does not require a pattern so as not to be deposited may be included. This process is not limited to the above-described process and a number of layers may be arbitrarily determined as intended by the person who performs the process.

The multilayered thin film transparent electrode for an electrochromic device which is comparatively durable and has a small error may be produced by the deposition process.

Figure 10:
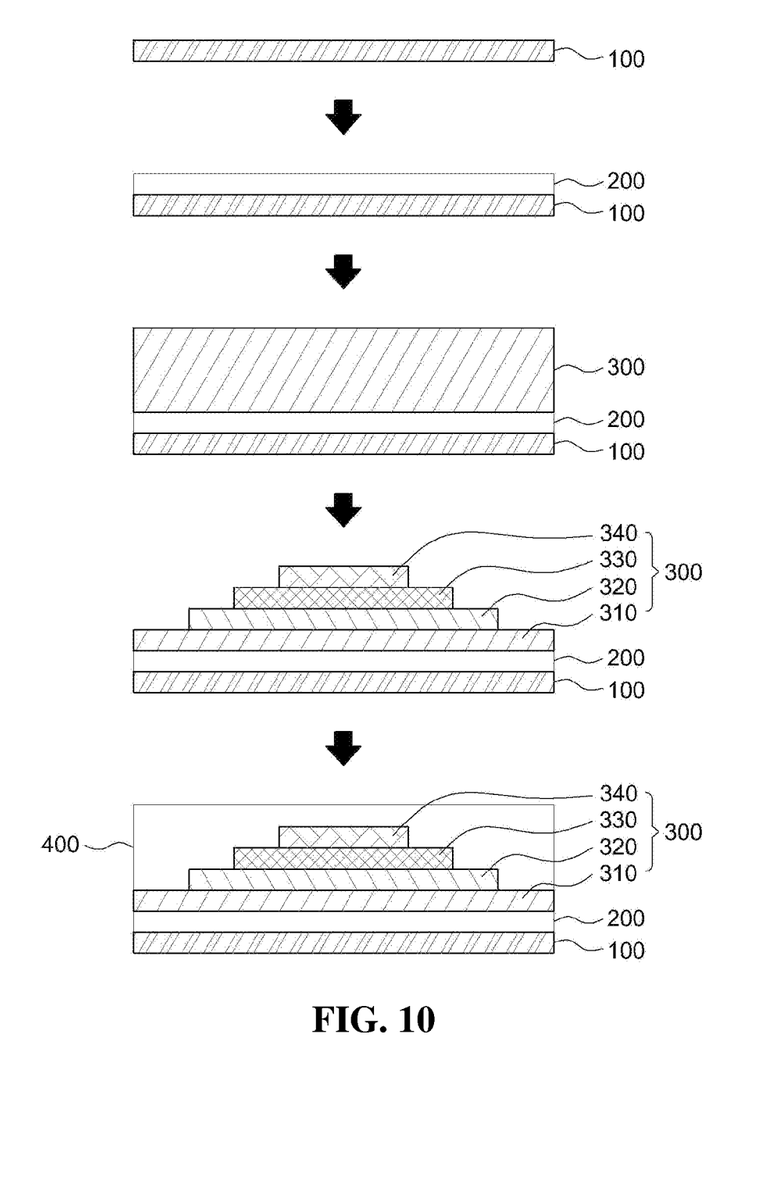
FIG. 10 is a flowchart illustrating a manufacturing method of a multilayered thin film transparent electrode for an electrochromic device using an etching process according to another exemplary embodiment of the present invention.

FIG. 10 is a flowchart illustrating a manufacturing method of a multilayered thin film transparent electrode for an electrochromic device using an etching process according to another exemplary embodiment of the present invention.

As illustrated in FIG. 10, in a step of forming the metal layer 300 in which a thickness of a center portion is larger than a thickness of an edge on the lower oxide layer 200, after forming the metal layer 300 on the lower oxide layer 200, the metal layer 300 is etched such that the first to n-th metal layers satisfying the following Equation 1 are included in this order.

(Area of upper portion of $n-2$-th metal layer)>(Area of upper portion of $n-1$-th metal layer)>(Area of upper portion of $n$-th metal layer)  [Equation 1]

(n is a natural number which is equal to or larger than 3)

Specifically, after deposing the metal layer 300 on the lower oxide layer 200, a step of etching the remaining part excluding an area of the n-th metal layer 340 for a predetermined time using an etching process and then etching a part excluding the areas of the n-th metal layer 340 and the n−1-th metal layer 330 for a predetermined time may be included. This process is not limited to the above-described process and a number of layers may be arbitrarily determined as intended by the person who performs the process.

High accuracy and yield may be expected by minute patterning of the etching process.

The manufacturing method of a multilayered thin film transparent electrode for an electrochromic device of the present invention may further include a heating process of 50 to 900° C. after performing the step of forming the upper oxide layer 400 on the metal layer 300.

For example, the heating process at 50 to 900° C. for 20 to 60 minutes under an argon gas atmosphere is included and thus the surface resistance of the multilayered thin film transparent electrode for an electrochromic device may be reduced.

Figure 11:
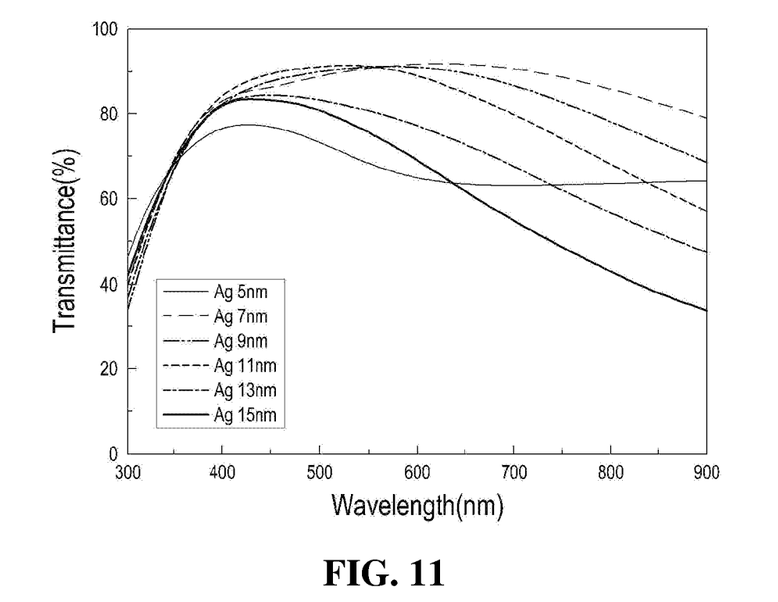
FIG. 11 is a graph illustrating a change in transmittance of a multilayered thin film transparent electrode for an electrochromic device in accordance with a thickness change of a metal layer, according to an exemplary embodiment of the present invention.
Figure 12:
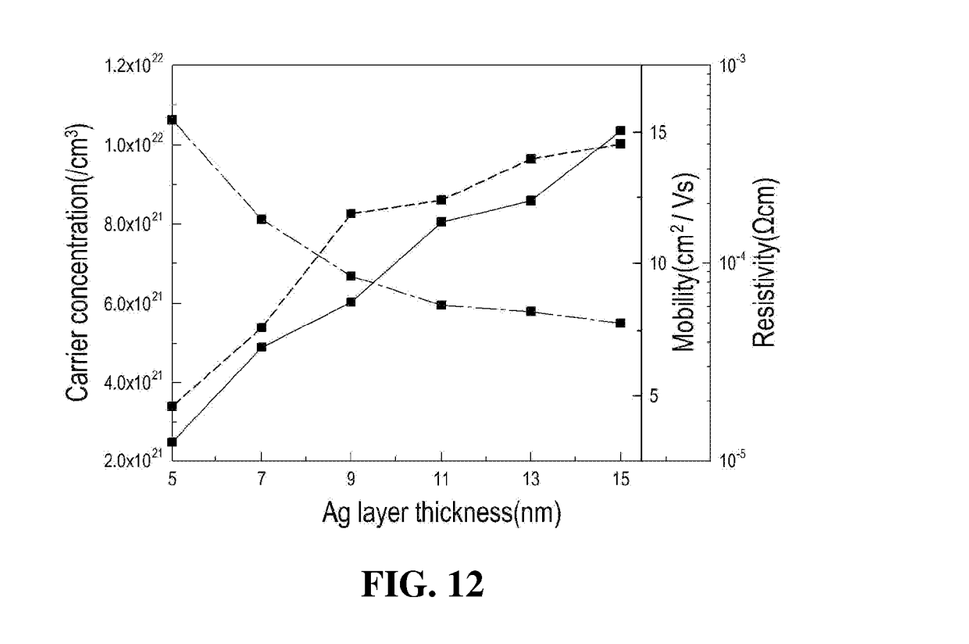
FIG. 12 is a graph illustrating a change in electrical characteristics of a multilayered thin film transparent electrode for an electrochromic device in accordance with a thickness change of a metal layer, according to another exemplary embodiment of the present invention.

FIG. 11 is a graph illustrating a change in transmittance of a multilayered thin film transparent electrode for an electrochromic device in accordance with a thickness change of a metal layer, according to an exemplary embodiment of the present invention and FIG. 12 is a graph illustrating a change in electrical characteristics of a multilayered thin film transparent electrode for an electrochromic device in accordance with a thickness change of a metal layer, according to another exemplary embodiment of the present invention.

As illustrated in FIG. 11, it is understood that the metal layer 300 is entirely influenced by the transmittance of light in accordance with the thickness change of 5 nm to 15 nm of Ag metal, but in the visible ray region, the influence of the transmittance of light in accordance with the thickness change of 5 nm to 15 nm of the Ag metal is relatively insignificant.

In contrast, as illustrated in FIG. 12, it is confirmed that the mobility of the metal layer 300 which is an electrical characteristic is improved in accordance with the thickness change of Ag metal of 5 nm to 15 nm and the resistivity is reduced.

Therefore, it is possible to produce the multilayered thin film transparent electrode for an electrochromic device which has an improved efficiency without affecting the transmittance of light.

Although a specific exemplary embodiment of the present disclosure has been described, it should be understood that various modification may be allowed without departing from the scope of the present disclosure. Therefore, the scope of the present invention should not be limited to the described embodiment but should be determined by the claims to be described below and equivalents thereof.

As described above, although the present disclosure has been described by limited embodiments and drawings, the present disclosure is not limited to the embodiments, and it will be apparent to those skilled in the art to which the present disclosure pertains that various modifications and variations may be made from the description. Therefore, the spirit of the present disclosure needs to be interpreted by the appended claims and all equivalent modifications are included within the spirit of the present disclosure.

The invention claimed is:

1. A multilayered thin film transparent electrode for an electrochromic device, the multilayered thin film transparent electrode comprising:
a substrate;
a lower oxide layer disposed on the substrate;
a metal layer disposed on the lower oxide layer; and
an upper oxide layer disposed on the metal layer,
wherein a thickness of a center portion of the metal layer is larger than a thickness of an edge thereof, and
wherein the metal layer comprises n consecutive metal layers disposed upon each other, each of the consecutive metal layers having a different area from one another such that for each of the consecutive metal layer, a bottom area of an upper metal layer is smaller than an upper area of a respective lower metal layer adjacent thereto, and n is a natural number which is greater than or equal to 3.

2. The multilayered thin film transparent electrode of claim 1, wherein the metal layer is formed of one single metal or an alloy of two or more selected from Ag, Au, Ti, Ni, Mo, Cu, and Al.

3. The multilayered thin film transparent electrode of claim 1, wherein the lower oxide layer and the upper oxide layer are formed of one single metal or an alloy of two or more metals selected from Ti, Ga, Al, Ge, As, Cu, Mn, Zr, Nb, Ru, Hf, Zn, Sr, Ba, Fe, Ag, In, Re, Cr, Ni, Mo, V, W, Mg, Si, Sn, and Ta.

4. The multilayered thin film transparent electrode of claim 1, wherein a thicknesses of the lower oxide layer and the upper oxide layer are 10 to 1000 nm and a thickness of the metal layer is 1 to 200 nm.

5. The multilayered thin film transparent electrode of claim 1, wherein the edge of the metal layer is located on a same line as an edge of the lower oxide layer.

6. The multilayered thin film transparent electrode of claim 1, wherein a side surface of the metal layer is formed to have a step shape.

7. The multilayered thin film transparent electrode of claim 1, wherein the each of the n consecutive metal layers have the same thickness.

8. The multilayered thin film transparent electrode of claim 1, further comprising:
a refractive index matching layer.

9. A manufacturing method of a multilayered thin film transparent electrode for an electrochromic device, the method comprising:
preparing a substrate;
forming a lower oxide layer on the substrate;
forming a metal layer on the lower oxide layer, wherein a thickness of a center portion of the metal layer is larger than a thickness of an edge thereof; and
forming an upper oxide layer on the metal layer,
wherein the metal layer comprises n consecutive metal layers disposed upon each other, each of the consecutive metal layers having a different area from one another such that for each of the consecutive metal layer, a bottom area of an upper metal layer is smaller than an upper area of a respective lower metal layer adjacent thereto, and n is a natural number which is greater than or equal to 3.

10. The manufacturing method of claim 9, further comprising:
after the forming of the upper oxide layer on the metal layer, heating at 50 to 900° C.

* * * * *